US007033092B2

(12) United States Patent
Horii et al.

(10) Patent No.: US 7,033,092 B2
(45) Date of Patent: Apr. 25, 2006

(54) APPARATUS, METHOD AND PROGRAM FOR PRODUCING SMALL PRINTS

(75) Inventors: Nobuyuki Horii, Tokyo (JP); Shinji Ishizuka, Tokyo (JP); Yasuhide Anbiru, Tokyo (JP); Hiroshi Ono, Tokyo (JP); Takayuki Uehara, Tokyo (JP); Mikihiro Kajihara, Suwa (JP); Seiji Tanaka, Suwa (JP)

(73) Assignee: Chartered Semiconductor Manufacturing Ltd., Singapore (SG)

( * ) Notice: Subject to any disclaimer, the term of this patent is extended or adjusted under 35 U.S.C. 154(b) by 7 days.

(21) Appl. No.: 10/942,101

(22) Filed: Sep. 16, 2004

(65) Prior Publication Data

US 2005/0086580 A1 Apr. 21, 2005

(30) Foreign Application Priority Data

Sep. 30, 2003 (JP) ............................ 2003-340290

(51) Int. Cl.
*B41J 11/44* (2006.01)
*B32B 33/00* (2006.01)

(52) U.S. Cl. ....................................... 400/76; 428/42.3

(58) Field of Classification Search .................. 400/76; 428/42.3, 41.8, 42.1, 42.2; 358/501, 527

See application file for complete search history.

(56) References Cited

U.S. PATENT DOCUMENTS

| | | | | |
|---|---|---|---|---|
| 5,816,392 | A * | 10/1998 | Kawagoe et al. | 206/232 |
| 5,828,442 | A * | 10/1998 | Wess | 355/40 |
| 6,942,332 | B1 * | 9/2005 | Truc | 347/105 |
| 2002/0081412 | A1 | 6/2002 | Truc | 428/42.3 |
| 2002/0114627 | A1 * | 8/2002 | Truc et al. | 396/429 |
| 2004/0021907 | A1 * | 2/2004 | Truc et al. | 358/1.18 |

FOREIGN PATENT DOCUMENTS

| | | |
|---|---|---|
| JP | 6-328791 | 11/1994 |
| JP | 7-314802 | 12/1995 |

* cited by examiner

*Primary Examiner*—Daniel J. Colilla
*Assistant Examiner*—Wasseem H. Hamdan
(74) *Attorney, Agent, or Firm*—George D. Saile; Rosemary L. S. Pike; Stephen B. Ackerman

(57) ABSTRACT

An apparatus, a method and a program are provided, each of which is intended to produce small prints. A variety of graphics are useful as framing elements for outer framing and tabulation with no need for increasing the volume of information to be prestored. One optional character, e.g., a pictogram, can be designated as a front ruling element and/or a rear ruling element for outer framing and tabulation. The optional character is chosen from among characters capable of input as character elements in lines of input characters. Upon execution of a print command, dot development is performed with respect to the front ruling portion and/or the rear ruling portion by utilizing fonts as character elements. Line types for upper ruling and lower ruling can also be designated, thereby effecting dot development depending upon the designated types of lines.

5 Claims, 6 Drawing Sheets

| | TITLE | OUTER FRAMING SYMBOLS - FRONT |
|---|---|---|
| | OPTION | GUIDE NO |
| PIC2a | ___ NONE | 1 |
| PIC2b | □ RULE _ | 2 |
| PIC2c | ○△□☆ | 3 |
| PIC2d | PUBLIC NOTICE | 4 |
| | ENVIRONMENT ___ | 5 |
| ⋮ | BAGGAGE ___ | 6 |
| | FOR WARNING _ | 7 |
| | JOB ___ | 8 |
| | SPORTS | 9 |
| PIC2j | PLAY ___ | 10 |
| | VIDEO _ | 11 |
| | MUSIC ___ | 12 |
| | CREATURE _ | 13 |
| | VEHICLE _ | 14 |
| | FOOD _ | 15 |
| | SCHEDULE ___ | 16 |
| | LIVING _ | 17 |
| | SEASON | 18 |
| | FAMILY ___ | 19 |
| PIC2t | ZODIAC SIGN ___ | 20 |
| PIC2u | STAR ___ | 21 |

FIG.6

| | TITLE | OUTER FRAMING SYMBOLS - REAR | |
|---|---|---|---|
| | OPTION | GUIDE NO | PROHIBITIV SELECTION CONDITION |
| PIC3a | ___ NONE | 1 | |
| PIC3b | □ RULE _ | 2 | |
| PIC3v | AUTO ___ | 3 | |
| PIC3c | ○△□☆ | 4 | |
| PIC3d | PUBLIC NOTICE | 5 | |
| | ENVIRONMENT ___ | 6 | |
| ⋮ | BAGGAGE ___ | 7 | |
| | FOR WARNING _ | 8 | |
| PIC3h | JOB ___ | 9 | |
| PIC3i | SPORTS | 10 | |
| PIC3j | PLAY ___ | 11 | |
| | VIDEO _ | 12 | |
| | MUSIC ___ | 13 | |
| PIC3m | CREATURE _ | 14 | |
| | VEHICLE _ | 15 | |
| | FOOD _ | 16 | |
| | SCHEDULE ___ | 17 | |
| | LIVING _ | 18 | |
| | SEASON | 19 | |
| | FAMILY ___ | 20 | |
| PIC3t | ZODIAC SIGN ___ | 21 | |
| PIC3u | STAR ___ | 22 | |

APPARATUS, METHOD AND PROGRAM FOR PRODUCING SMALL PRINTS

CROSS-REFERENCE TO RELATED APPLICATIONS

The present application claims the benefit of priority of Japanese Patent Application No. 2003-340290 filed Sep. 30, 2003, the subject matter of which is hereby incorporated by reference.

BACKGROUND OF THE INVENTION

1. Field of the Invention

The present invention relates to an apparatus for producing small prints, a method for producing such prints, and a program for producing such prints. Each of the apparatus, method and program according to this invention is suitable for application, for example, to a specialized tape printing machine, a tape printing system in which a personal computer and a label printer are interconnected to each other, a specialized stamp (signet) making machine, and a stamp making system in which a personal computer is connected to stamp making peripherals.

2. Description of the Related Art

A specialized tape printing machine, for example, is designed to print a string or strings of input characters on a continuous tape, where desired, and to discharge and cut a printed tape length. This tape length with the characters printed thereon is generally called a label. The term character used here is construed as further including symbols, pictograms, outer frames, tint blocks and the like.

As described above, prints produced by the tape printing machine are utilized as labels, and therefore, they are frequently ornamented with respect to their respective print contents as compared with prints in common use. To cope with this trend, the tape printing machine is loaded with various ornamental functions.

Japanese Patent Laid-Open No. 6-328791 discloses a printing apparatus in which graphics, but not lines, are printed in a front ruling portion or a rear ruling portion of an outer frame, the outer frame being provided to enclose therein a string or strings of input characters. Here, the front ruling portion corresponds to an upper ruling portion in vertical writing, and the rear ruling portion corresponds to a lower ruling portion in vertical writing. In this description, it should be noted that front ruling portions in outer framing and tabulation in horizontal writing as well as upper ruling portions in outer framing and tabulation in vertical writing are simply collectively termed as "front ruling portions," whereas rear ruling portions of outer framing and tabulation in horizontal writing as well as lower ruling portions in outer framing and tabulation in vertical writing are simply collectively termed as "rear ruling portions."

In addition, Japanese Patent Laid-Open No. 7-3142802 discloses a printing apparatus in which one or a plurality of designated characters other than a line or lines are printed in small posture and in linear arrangement on an outer ruling portion, the outer ruling portion being provided to enclose therein a string or strings of input characters.

The conventional printing apparatus of Japanese Patent Laid-Open No. 6-328791, however, has a problem in that pairs of graphics capable of forming a front ruling portion and a rear ruling portion in outer framing are limited to those prepared in advance in the apparatus. Thus, the user has a narrow range of options in choosing the graphics. Another problem is that because the graphics for use in the front ruling portion and those for use in the rear ruling portion are placed in paired relation to each other, the user has no option but choose the graphics by pair. This imposes further restriction on patterns that can form the front ruling portion and the rear ruling portion. In order to open up the options, the apparatus must store numerous pairs of graphics for the front and rear ruling portions, resulting in increased memory elements which may in the end all for scaling up of the apparatus.

In the conventional apparatus of Japanese Patent Laid-Open No. 7-314802, the character or characters can be arbitrarily chosen which are linearly arranged in the outer ruling portion. However, this apparatus poses a problem in that since the character arrangement is made in a linear posture, the ornamental effects so obtained are poorer than those obtained by arranging graphics in the front and rear ruling portions.

SUMMARY OF THE INVENTION

Due to the foregoing problems of the conventional art, a keen demand has been made for the development of an apparatus, a method and a program, each of which is suitably useful for producing small prints and is capable of using a wide variety of graphics as frame elements for outer framing or tabulation with no need for increasing the volume of information to be prestored.

A first aspect of the present invention provides an apparatus for producing a small print, which has a frame imparting function including at least a front ruling element, a rear ruling element, an upper ruling element and a lower ruling element with respect to a few lines of input characters, the apparatus including: arbitrarily frame element designating means for designating one optional character, for use as at least one of the front ruling element and the upper ruling element, from among characters capable of input as character elements in the lines of input characters; and arbitrarily frame element representing means for dot-developing, upon execution of a print command, the optional character element designated by the arbitrarily frame element designating means as at least one of the front ruling element and the upper ruling element.

A second aspect of the invention provides a method for producing a small print, which has a frame imparting function including at least a front ruling element, a rear ruling element, an upper ruling element and a lower ruling element with respect to a few lines of input characters, the method including: an arbitrarily frame element designating step for designating one optional character, for use as at least one of the front ruling element and the upper ruling element, from among characters capable of input as character elements in the lines of input characters; and an arbitrarily frame element representing step for dot-developing, upon execution of a print command, the optional character element designated in the arbitrarily frame element designating step as at least one of the front ruling element and the upper ruling element.

A third aspect of the invention provides a program for producing a small print, wherein a computer describes as executable codes steps for a method of the production of the small print, the method having a frame imparting function including at least a front ruling element, a rear ruling element, an upper ruling element and a lower ruling element with respect to a few lines of input characters, the method including: an arbitrarily frame element designating step for designating one optional character for use as at least one of the front ruling element and the upper ruling element, from among characters capable of input as character elements in the lines of input characters; and an arbitrarily frame element representing step for dot-developing, upon execution of a print command, the optional character element designated in the arbitrarily frame element designating step as at least one of the front ruling element and the upper ruling element.

BRIEF DESCRIPTION OF THE DRAWINGS

FIG. 6 is a view explanatory of a first-hierarchized options of graphics established by the user for use in a rear ruling portion as illustrated in such one embodiment of the invention.

DESCRIPTION OF THE PREFERRED EMBODIMENTS

The present invention will now be described below in greater detail. With reference to the drawings, some embodiments of the invention are given in which the apparatus, method and program of the invention have been applied, respectively, to a tape printing apparatus, a tape printing method and a tape printing program.

(A) First Embodiment

Figure 1:
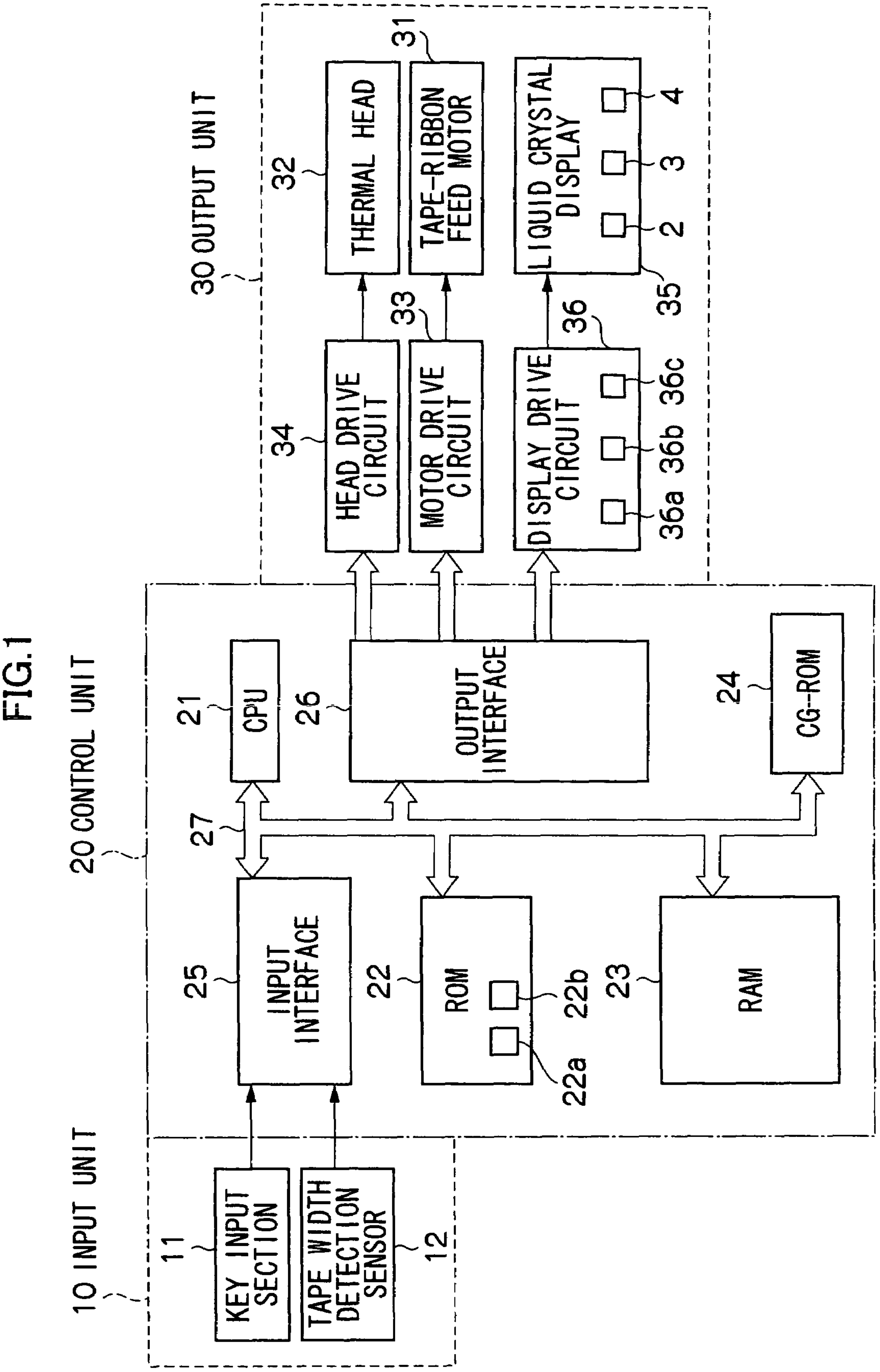
FIG. 1 is a block diagram showing an electrical construction of a tape printing apparatus used in one embodiment of the present invention.

Firstly, the entire electrical construction of a tape printing apparatus used in the first embodiment is explained by referring to the block diagram shown in FIG. 1. This tape printing apparatus is assembled for exclusive use in label production.

As viewed in FIG. 1, the printing apparatus of the first embodiment is structured broadly with an input unit 10, a control unit 20 and an output unit 30. The control unit 20 executes processing of information received from the input unit 10, or processing required according to processing stages and the like at that time, and allows the output unit 30 to output display or print of the results and the like obtained by the control unit 20.

The input unit 10 is provided, though its details are omitted, with a key input section 11 having a push key (or a dial key), and a tape width detection sensor 12. The key input section 11 generates character codes and various control data that should be transmitted to the control unit 20. The tape width detection sensor 12 detects the width of a tape loaded in the apparatus and then gives information concerning the detected tape width to the control unit 20. In practice, the tape is received in a tape cartridge, and the cartridge has physical distinguishing elements such as openings or the like defined to determine tape widths. Thus, the tape width detection sensor 12 reads such a distinguishing element and then outputs information on a tape width. The key input section 11 is provided with a key to initiate imparting of outer framing or tabulation, which key may be a specialized key or a combination key used together with a function key, and a key to initiate selection of symbols, which key may be a specialized key or a combination key used together with a function key.

The output unit 30 includes a print section and a display section. A tape/ribbon feed motor 31 made up, for example, of a stepping motor, a DC motor or the like, feeds a tape and an ink ribbon loaded in the apparatus, but not shown, to a predetermined print position or up to the exterior of the apparatus. A print head 32 is disposed immovably, for example, and prints a running tape by means of heat-transfer printing. Here, a thermal head is shown used as the print head 32. The tape/ribbon feed motor 31 and the thermal head 32 are driven by a motor drive circuit 33 and a head drive circuit 34, respectively, under the control of the control unit 20. A printed tape length is cut, for example, through external forcing applied by the user, or with a motor-driven cutter not shown.

The tape printing apparatus of the first embodiment has as a display a liquid crystal display 35 dimensioned to display, for example, several characters of a given size (e.g., six characters) over a few lines of characters (e.g., one line). The liquid crystal display 35 is driven by a display drive circuit 36 under the control of the control unit 20.

A display surface, not shown, of the crystal liquid display 35 has a character display field 2 where lines of input characters and/or print images are displayed, a line number indicator which is blink-controlled in accordance with the number of lines of input characters, or with a line where a cursor is positioning, and an attribute indicator which expresses various attributes and the like with regard to lines of input characters. The attribute indicator when in ON means that any attribute is being used which is expressed by any character described around the inside of the display surface corresponding to the attribute indicator. Attributes to be instructed by the attribute indicator include those related to character sizes, those related to input of "kana" characters (of Japanese lettering), roman alphabets and the like, those related to unitary overall character lines (hereinafter referred to as "texts") due to automatic setting of tape lengths and the like, those related to unitary character lines massed to some extent in vertical writing (hereinafter referred to as "paragraphs"), those related to unitary decorative letters, English letters and the like, and those related to whether fundamental formats are used.

As described above, the liquid crystal display 35 is provided with the character display field 2, the line number indicator section 3 and the attribute indicator section 4. Consequently, the display drive circuit 36 is also provided, though broadly, with a drive section 36*a* equivalent to the character display field, a drive section 36*b* equivalent to the line number indicator section, and a drive section 36*c* equivalent to the attribute indicator section.

Also in FIG. 1, the control unit 20 is constructed with a microcomputer, for example, and a CPU 21, a ROM 22, a RAM 23, a character generator ROM (CG-ROM) 24, an input interface 25 and an output interface 26 are interconnected to each other with a system bus 27 interposed therebetween.

The ROM 22 is assembled with one or a plurality of ROM chips, while the ROM 22 has stored therein various processing programs and fixed data such as "kana"-"kanji" conversion dictionary data ("kana" and "kanji" being of Japanese lettering) and the like. Stored in the ROM 22 are, for example, an outer framing-tabulation imparting program 22*a* and a print processing program 22*b*.

The RAM 23 is assembled with one or a plurality of RAM chips and is used as a working memory, and moreover, has stored therein fixed data input by the user and the like. In FIG. 1, the RAM 23 is depicted as it is, but should be understood to further include other memory elements such as EEPROM and the like. The RAM 23 has a print buffer in which the character lines to be printed are dot-developed and stored, a display buffer in which the displayed images of input character lines are stored, a text buffer in which the character data on print and input are stored, a line number indicator state retaining buffer in which the states displayed on the line number indicator are stored, an attribute indicator state retaining buffer in which the states displayed on the attribute indicator are stored.

The CG-ROM 24 stores dot patterns of characters and symbols prepared by the tape printing apparatus of this embodiment and, upon receipt of data encoded to specify characters, outputs the corresponding dot patterns. A CG-ROM for displaying use and a CG-ROM for printing use can be disposed independently. In storing font information, either one of an outline font system and a bitmap system may be used, but the outline font system is preferable as it is easily adaptable to various font sizes. Information on graphic patterns for exclusive use in a front ruling portion and a rear ruling portion in outer framing and tabulation may be retained as fixed data in the ROM 22, or as part of the font information in the CG-ROM 24.

Here, characters, the fonts of which have been prepared by the CG-ROM 24, and which can be included as printable lines of input characters, are roughly classified into two types, depending upon an input process to be used. One type falls under the category of characters in common use, such as "hiragana", "katakana", alphanumeric characters and "kanji" characters ("hiragana," "katakana" and "kanji" being of Japanese lettering), which are input with the key entry section 11 manipulated by an ordinary process, whereas the other type corresponds to symbols that are input by symbol selection processing. The word symbol denotes characters to be input by symbol selection processing and includes, in addition to ordinary symbols, pictograms, encircled numerals and the like. For example, a symbol selection key is manipulated in the key entry section 11, and menus are displayed to select symbol types such as "for video," "for warning," or "zodiac sign." When a desirable symbol type is selected, menu display is executed to select a symbol associated with the selected symbol type (e.g., when the symbol "zodiac sign" is selected, 12 animal signs (symbols) are displayed). As a specific example of this process, use may be made of the process utilized in existing tape printing apparatus.

The input interface 25 interfaces the input unit 10 with the control unit 20. The output interface 26 interfaces the output unit 30 with the control unit 20.

The CPU 21 processes processing programs stored in the ROM 22, which programs are determined by input signals coming from the input unit 10 or from processing stage at that time, by utilizing the RAM 23 as a working area, and where need, by using fixed data stored in the ROM 22 and the RAM 23. Thus, the CPU 21 allows the processing conditions, processing results and the like to be displayed on the liquid crystal display 35, or to be printed on a tape not shown.

Next, explanation is provided as to the particular operation (tape printing method-production method of small prints) of the tape printing apparatus illustrated herein. The most significant feature of this embodiment resides in input operation (designated operation) for outer framing or tabulation. This particular operation is described below.

Figure 2:
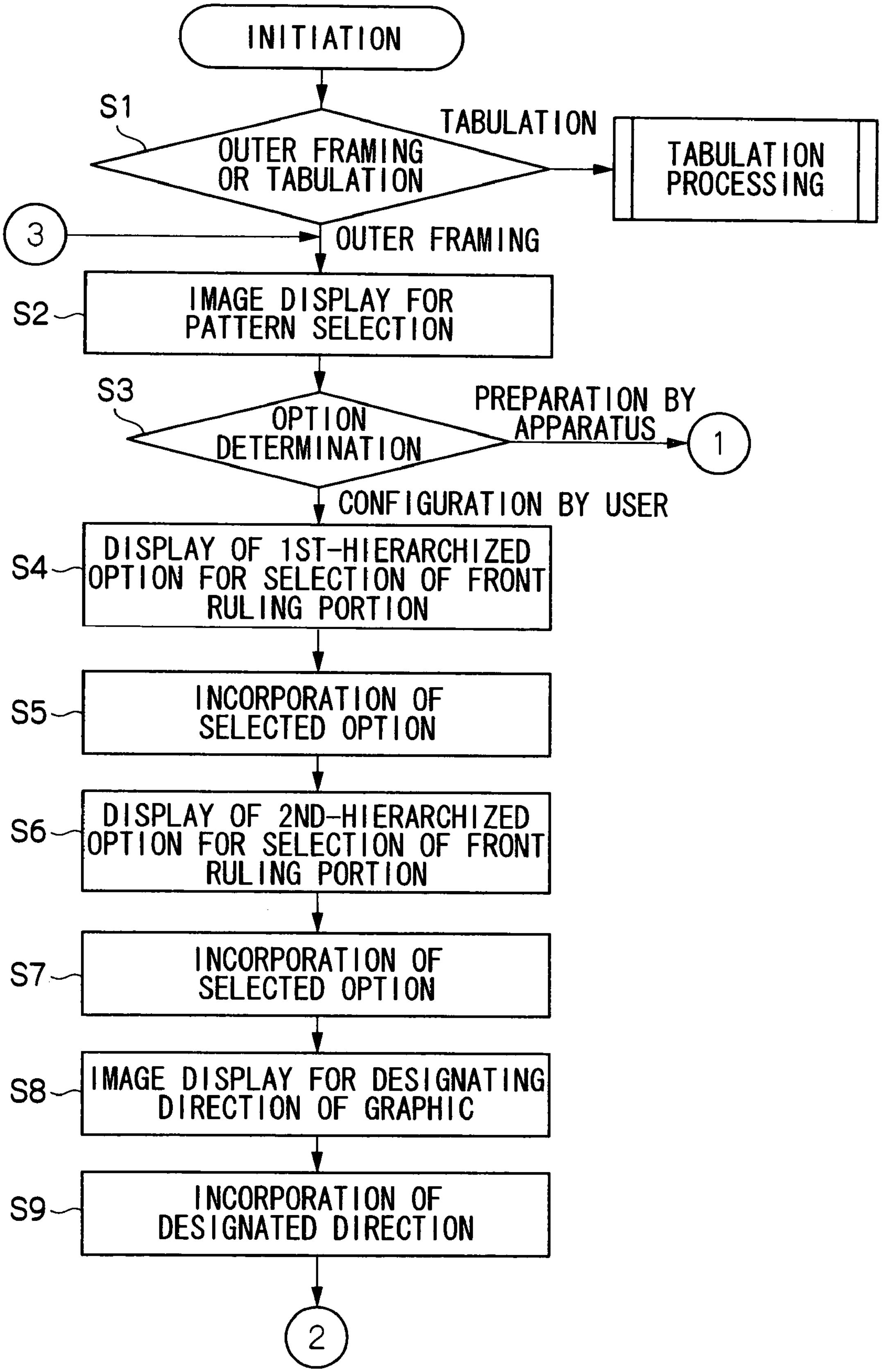
FIG. 2 is a first flow chart showing the manner in which outer framing and tabulation are processed and imparted as illustrated in such one embodiment of the invention.
Figure 3:
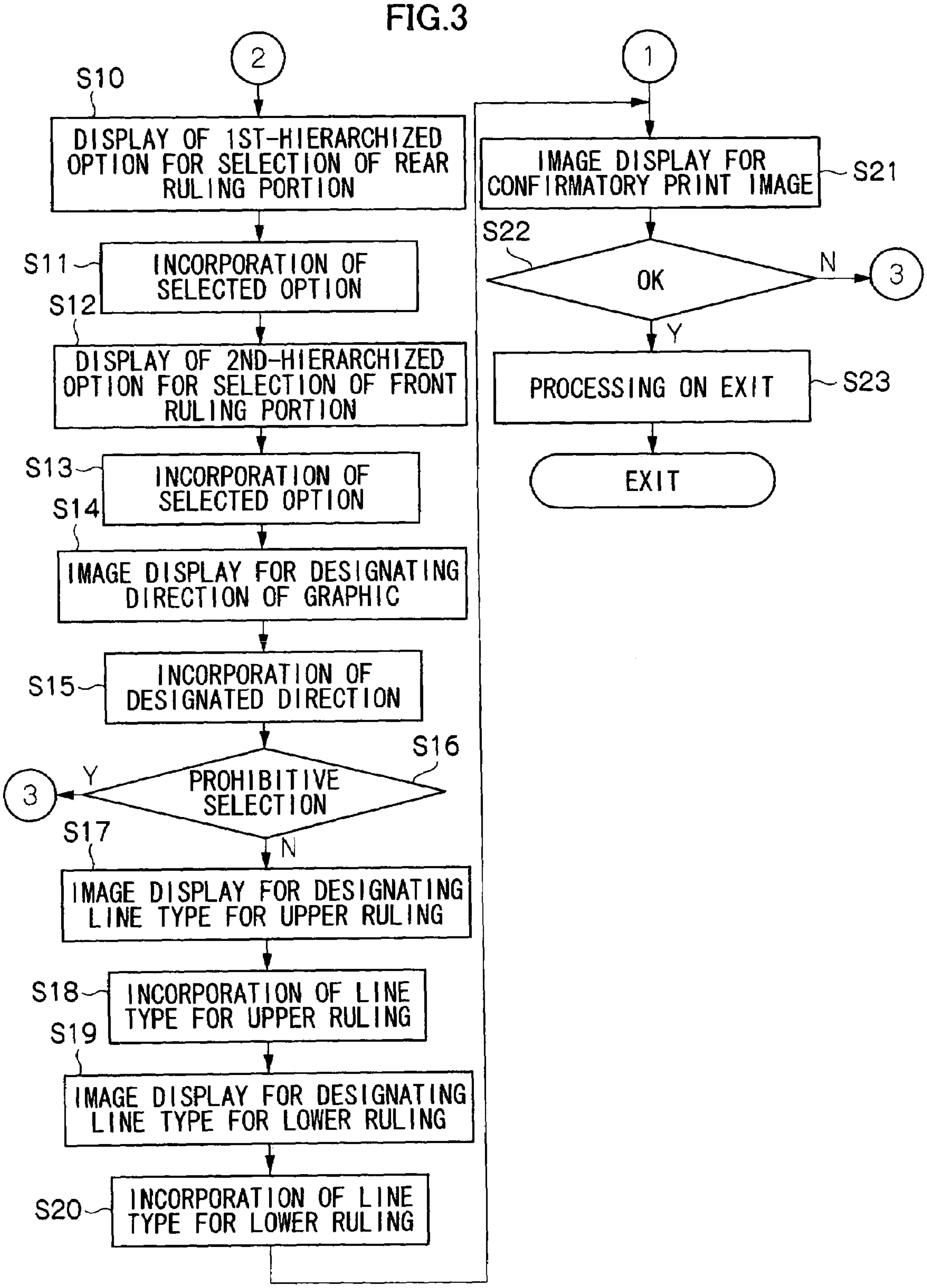
FIG. 3 is a second flow chart showing the manner in which outer framing and tabulation are processed and imparted as illustrated in such one embodiment of the invention.

Upon manipulation of a key to initiate processing for imparting outer framing and tabulation, the CPU 21 begins with processing steps (outer framing-tabulation imparting program 22*a*) shown in FIGS. 2 and 3.

First, the CPU 21 allows the user to select outer framing or tabulation to be imparted (S1). Here, outer framing and tabulation are different from each other in that horizontal rules are present or absent between rows (vertical rules in vertical writing). Except for this difference, the processing is substantially the same in outer framing and tabulation. The following description is directed to an instance where outer framing has been selected.

When outer framing is selected to be imparted, the CPU 21 allows the liquid crystal display 35 to display a pattern selection image PIC 1 from which to select graphic patterns to be used for a front ruling portion and a rear ruling portion in outer framing (S2), and then, determines whether patterns prepared in the apparatus, or patterns configured by the user have been selected as graphic patterns (S3).

Figures 4, 5:
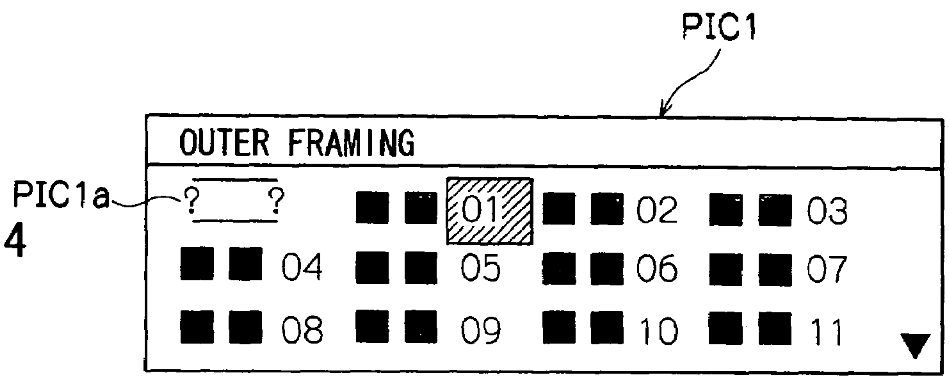
FIG. 4 is a view explanatory of examples of images to be selected as outer frame patterns as illustrated in such one embodiment of the invention.
FIG. 5 is a view explanatory of a first-hierarchized options of graphics established by the user for use in a front ruling portion as illustrated in such one embodiment of the invention.

FIG. 4 explains an example of the pattern selection image PIC 1 displayed on the liquid crystal display 35.

The patterns prepared in the apparatus are 86 in number, for example. The pattern selection image PIC 1 has 87 options in total, including an option of selecting any apparatus-prepared pattern and an option PIC 1*a* of selecting any user-configured pattern. Because of a limited field in the display surface of the liquid crystal display 35, the pattern selection image PIC 1 is partially displayed by up-and-down scrolling in response to cursor movement. The option PIC 1*a* of selecting the user-configured patterns is placed as an option at a first position, and the apparatus-prepared patterns are assigned identification numbers, "01" through "87." An assignment of "00" is not found in FIG. 4, but the option PIC 1*a* of selecting the user-configured pattern is assigned "00" as the identification number. A default option is indicated, for example, by "01" as the identification number. An option which is pointed by a cursor immediately after display of the pattern selection image PIC 1 is an option selected immediately before display of the above selection image. Such an option if absent is a default option.

Although none of the apparatus-prepared patterns is specifically represented in FIG. 4, a specific graphic (pattern) to be used for the front ruling portion and a specific graphic (pattern) to be used for the rear ruling portion are displayed in pair. Namely, a specified graphic is displayed in each black square in FIG. 4. On the other hand, the option PIC 1*a* of selecting the user-configured patterns is displayed as a graphical form containing a pair of "?" marks, which question marks mean that any graphics for the front and rear ruling portions can be optionally designated by the user.

In order to select any desired option, the user manipulates the selection key with the cursor positioned on that option, or manipulates the execution key after key entry of any two-digit numeral chosen from the range of "00" to "87."

In the case where the option PIC 1*a* of selecting the user-configured patterns is selected, the CPU 21 allows the liquid crystal display 35 to display first-hierarchized images (not shown) from which to select graphics for the front ruling portion (S4), thereby incorporating any first-hierarchized option selected by the user (S5).

FIG. 5 explains options of the first-hierarchized images from which to select graphics for the front ruling portion. However, FIG. 5 does not represent how to display the options. Each of the options of the first-hierarchized images is expressed, for example, with a four-character space allocated.

An option PIC 2*a* arranged in the first row is an option used to leave the front ruling portion blank. In other words, this option means that neither a line nor a graphic is depicted in the front ruling portion. An option PIC 2*b* in the second row is an option used to drawn a line or lines in the front ruling portion. Options PIC 2*c* to PIC 2*u* in the third row et seq. are options used to select a symbol "○Δ•☆," a symbol "public notice, " . . . a symbol "stars." Here, the symbols eligible for selection can be all the symbols that are capable of symbol entry during character input, or can be part of the symbols that are chosen from among graphics deemed suitable for the front and rear ruling portions. For example, encircled numerals may be selected from symbols in the state of character input, or symbols of encircled numerals may be excluded from symbols to be selected as graphics for the front ruling portion.

FIG. 5 also shows guide numbers which are the identification numbers for calling up guidance messages upon positioning of the cursor on the selected option. The guidance messages are stored, for example, in a guidance message table, not shown, and which are displayed automatically or in response to the user's manipulation of a help key. For example, when the cursor is placed on the option PIC 2*a*, a message is displayed which says that "Nothing is printed in the front ruling portion."

An option that is pointed by the cursor immediately after display of the first-hierarchized images for selecting any graphic for the front ruling portion is an option selected during processing of imparting outer framing immediately before those images have been displayed. Such an option if absent is a default option (e.g., the PIC 2*b* related to lines).

Upon incorporation of the information on the first-hierarchized options, the CPU 21 allows the liquid crystal display 35 to display second-hierarchized images (not shown) provided to select graphics for the front ruling portion (S6). In response to this display, any second-hierarchized option selected by the user is incorporated (S7).

Here, in the case where the PIC 2*a* option is selected in the first hierarchy, which option indicates the absence of a graphic in the front ruling portion, the successive step is not transited to S6, but directly to a step 10 as will be described later. In the case where the PIC 2*b* option is selected in the first hierarchy, which option indicates that lines are provided in the front ruling portion, the CPU 21 allows the second-hierarchized images (not shown) to be displayed in selecting line types such as of heavy, thin, broken, dotted, wavy solid, and jagged solid, thereby selecting any desired line type. In this way, the graphic for use in the front ruling portion has been decided to be the line thus selected. Further, in the case where a symbol-related option is selected in the first hierarchy, the CPU 21 allows the second-hierarchized images (not shown) to be displayed in selecting symbol types, thereby selecting any desired symbol type. Thus, the symbol for use in the front ruling portion has been decided to be the symbol thus selected. The second-hierarchized selective images, though not shown, are similar to selective images used for symbol entry during character input.

Subsequently, the CPU 21 allows display of images (not shown) provided to designate the directions of graphics that contain the graphics selected for use in the front ruling portion (S8), thereby incorporating the designated directions (inherent or turned) (S9).

If the graphic selected for the front ruling portion is of a linear nature, the above-mentioned steps, step 8 and step 9, are omitted. When a bullet train is depicted symmetrically and asymmetrically as shown in FIGS. 7B and 7C, both views of which are further described later, the graphical feelings vary depending upon the directions of the train. Therefore, the directions of graphics have been made selectively changeable in this embodiment. If the graphic selected for use in the front ruling portion is a symmetrical graphic such as one shown in FIG. 7A in which a mouse and a bear cub are depicted, step 8 and step 9 may be omitted. In such an instance, for example, flags can be provided to indicate symmetry and asymmetry as attribute information on symbols. Different flags may be provided for horizontal writing and for vertical writing in such a manner that the designation of directions is omitted in horizontal writing, but is allowed in vertical writing. For example, even in horizontal writing, it may also be made possible to designate the directions of graphics as being changeable not only right and left, but also above and below.

Thereafter, the CPU 21 allows the liquid crystal display 35 to display the first-hierarchized images (not shown) provided to select graphics for use in the rear ruling portion (S10), thereby incorporating any option selected by the user in the first hierarchy (S11).

FIG. 6 explains options of the first-hierarchized images from which to select graphics for the rear ruling portion. However, FIG. 6 does not represent how to display the options. To the notation of the options of the first-hierarchized images, a four-character space allocated, for example.

The options of the first-hierarchized images provided to select the graphics for the rear ruling portion are substantially the same as the options of the first-hierarchized images provided to select the graphics for the front ruling portion. Such two groups of options are different on the following two points.

One point is that an "auto" option PIC 3*v* is provided. By the "auto" option PIC 3*v* is meant that in accordance with the graphic selected for the front ruling portion, the tape printing apparatus of this embodiment automatically determines any graphic for the rear ruling portion in accordance with the graphic selected for the front ruling portion. Here, automatic determination rules can be established at will. For example, one rule may be applied which indicates that "When a graphic selected for the front ruling portion is asymmetrical, a graphic to be selected for the rear ruling portion is placed in a turned posture. When a graphic selected for the front ruling portion is symmetrical, a graphic to be selected for the rear ruling portion is placed in the same direction as is in the front ruling portion."

The other point is that in relationship to the graphic selected for the front ruling portion, each of the options of graphics to be selected for the rear ruling portion is conditioned such that selection is prohibited as to the options of graphics selected for the front ruling portion (or the second-hierarchized options). As a first example, an option PIC 3*h* related to "job" is so conditioned that when the graphic selected for the front ruling portion is a symbol belonging to an option PIC 2*j* related to "play," the PIC 3*h* option cannot be selected as the graphic for the rear ruling portion. As a second example, an option PIC 3*m* related to "creature" is so conditioned that when the graphic selected for the front ruling portion is a “dog” graphic, a “monkey” graphic cannot be selected as the graphic for the rear ruling portion. Moreover, even in the case where graphic-to-graphic selection is not prohibited, a prohibitive condition may be made which prohibits selection when the direction of one graphic is set to be turned.

An option that is pointed by the cursor immediately after display of the first-hierarchized images for selecting graphics for the rear ruling portion is an option selected during processing of imparting outer framing immediately before those images have been displayed. Such an option if absent is a default option (e.g., the “auto” option PIC 3*v*).

Except that “none” and “auto” are selected, the CPU 21 then allows the liquid crystal display 35 to display the second-hierarchized images (not shown) provided to select graphics for the rear ruling portion (S12), thereby incorporating the option selected by the user in the second hierarchy (S13). Further, the CPU 21 allows for display of images (not shown) provided to designate the directions of graphics that contain the graphics selected for the front ruling portion (S14), thereby incorporating the designated directions (inherent or turned) (S15). Conditions may be made for designating the directions of graphics (e.g., with regard to asymmetrical graphics only) in the same manner as noted above in connection with the front ruling portion.

When the graphics (inclusive of the directions) of the front and rear ruling portions are determined as described above, the CPU 21 judges whether the graphic for the rear ruling portion is prohibited from selection in relation to the graphic for the front ruling portion (S16). Such a judgment can be collectively made not only at this stage, but also immediately after any first-hierarchized option is selected in step 11 with respect to the graphic for the rear ruling portion, or immediately after any first-hierarchized option is selected in step 13 with respect to the graphic for the rear ruling portion.

If the graphic for the rear ruling portion is held prohibited from selection in relation to the graphic selected for the front ruling portion, the CPU 21 allows processing of selecting a pattern for outer framing to be recommenced fresh in step 2 noted previously. This recommencement may also be performed in step 10, step 12 or step 14 at any stage where the graphic for the rear ruling portion is selected.

By contrast, if the graphic for the rear ruling portion is held unprohibited from selection in relation to the graphic selected for the front ruling portion, the CPU 21 allows display of images (not shown) provided to select line types for upper ruling (S17), thereby incorporating any line type for upper ruling selected by the user (S18). Similarly, the CPU 21 allows display of images (not shown) provided to select line types for lower ruling (S19), thereby incorporating any line type for lower ruling selected by the user (S20).

When information on outer framing based on any user-configured pattern is prepared as described above, or when any of the apparatus-prepared patterns is instructed in step 3, the CPU 21 allows display of print preview images (see FIGS. 7A to 7D), which images are provided to confirm the print images regarding such outer framing patterns and character lines enclosed therein (S21), and then judges whether the user has agreed or disagreed with such print images (S22).

Even in the case of patterns configured by the user, print displaying of the print images is substantially the same as has been practiced in conventional tape printing apparatus with respect to the apparatus-prepared patterns. More specifically, dot development is performed by taking a graphic for the front ruling portion derived from the user’s configured pattern, as a graphic for the front ruling portion derived from the apparatus-prepared pattern, and by taking a graphic for the rear ruling portion derived from the user’s configured pattern, as a graphic for the rear ruling portion derived from the apparatus-prepared pattern. Even when symbols are used for the front and rear ruling portions, font information on which to base dot development is the same as font information on symbols to be included in a line or lines of input characters. That is to say, with regard to the same symbols, font information used for the front and rear ruling portions is not provided independently of font information included in a line or lines of input characters. When outlines fonts are used, the same font information can satisfy the above two instances.

Display processing of a print image with respect to an apparatus-prepared pattern is different from display processing of a print image with respect to a user-configured pattern. One difference to be noted is that graphics selected for the front ruling portion and/or the rear ruling portion and turned in direction are reversed right and left during dot development. Another difference is that both upper ruling and lower ruling are subjected to dot development so as to meet with the line types as instructed.

Figure 7A:
FIG. 7A through FIG. 7D are views explanatory of examples of printed images, i.e., examples of produced labels, according to some patterns established by the user as illustrated in such one embodiment of the invention.
Figure 7B:
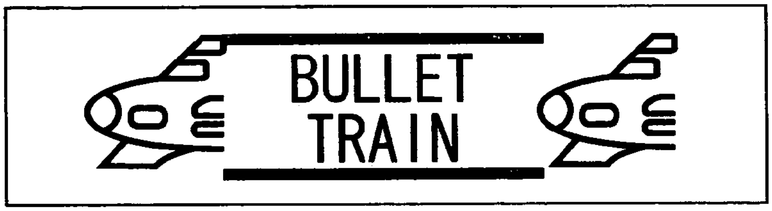
Figure 7C:
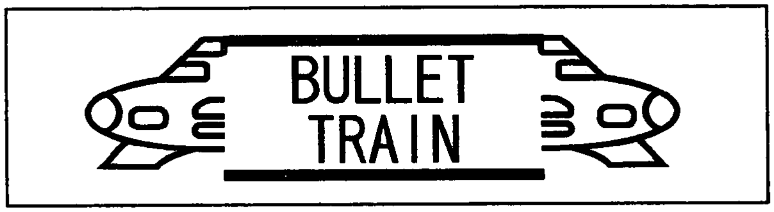
Figure 7D:
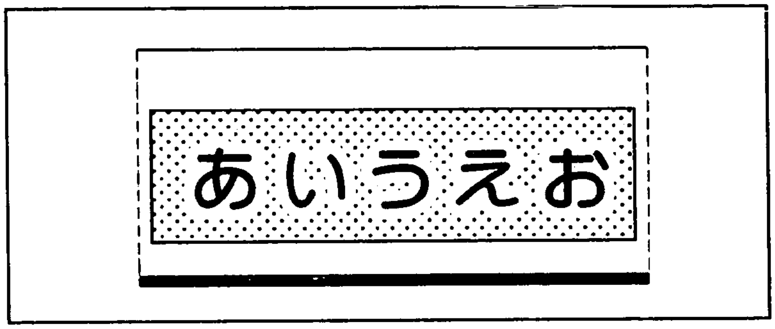

FIGS. 7A through 7D explain examples of printed images resulting from user-configured patterns. These views can be regarded as showing labels as produced. In FIG. 7A, a mouse symbol is selected from the selective symbols as a graphic for the front ruling portion, and a bear cub symbol is selected from the selective symbols as a graphic for the rear ruling portion. In FIGS. 7B and 7C, two symbols of bullet trains are selected from the selective symbols as graphics for the front and rear ruling portions. FIG. 7B shows that the graphics (symbols) of bullet trains are arranged in one direction in the front and rear ruling portions. FIG. 7C shows that the bullet train graphic in the rear ruling portion is designated as being turned with respect to the direction inherently prepared. In FIG. 7D, the outer frame is drawn by lines, and broken lines are designated as front and rear rules, a thin line is designated as an upper rule, and a heavy line is designated as a lower rule.

When the user instructs OK with respect to a print image displayed for confirmation, the CPU 21 returns displaying back to display contents that appear immediately before the key is manipulated to initiate processing for imparting outer framing or tabulation, or executes exit processing in which information on outer framing is remembered as auxiliary information concerning a line or lines of input characters (S23), thus completing a series of processing steps for imparting outer framing or tabulation. Conversely, if the user instructs NO with respect to a print image displayed for confirmation, the CPU 21 allows outer framing to be again selected in step 2.

When tabulation is selected, its processing steps are substantially the same manner as those used when outer framing is selected as described above. A difference to be noted is that selection of the types of lines used between columns and between rows is included in a series of steps for processing user-configured patterns.

A processing step effected upon execution of a print command is similar to that effected upon display of a print image. A point of difference is that if the processing step performed upon display of a print image is regarded as one in which a tape with a given width is loaded irrespective of the width of a tape actually loaded, the sizes of graphics for the front and rear ruling portions in outer framing, and the types of lines for upper and lower rulings are determined in accordance with the tape width.

According to the first embodiment, some specific functions are provided, as described above, such that the user can form outer framing patterns and tabulation patterns. Therefore, the user is able to not only choose outer framing patterns and tabulation patterns from among the apparatus-fixed patterns, but also form any desired outer framing patterns and tabulation patterns unless the apparatus-fixed patterns contain patterns that would meet the user's need.

In the user-configured outer patterns and tabulation patterns, it is possible to refrain from arranging a graphic or a line in either one or both of the front and rear ruling portions. Further, optional symbolic graphics can be arranged, and line types can be designated if the graphics are selected to be lines. In addition, line types can be designated for use in upper ruling and lower ruling. Thus, a wide variety of outer framing patterns and tabulation patterns are possibly formed.

Moreover, the outer framing patterns and tabulation patterns are formed by utilizing existing symbol information (e.g., outline font information) which can be included in lines of input characters. This means that even if any functions are added to form additional outer faming patterns and tabulation patterns, the volume of data newly needed for the functions can be minimized. Namely, the memory volume required by memory means such as ROM due to addition of the functions can be held at a minimum level. This dispenses with extra memory elements and prevents the apparatus from becoming scaled up.

(B) Modified Embodiment

Various modified forms have been described in the first embodiment. Moreover, a modified embodiment is illustrated as given below.

In the first embodiment, the symbols are shown selected from menu display. In the modified embodiment, any other process for the input of symbols can be used. For example, symbols may be selected from codes input and corresponding to the symbols.

Further, in the first embodiment, the types of symbols capable of inclusion in lines of input characters have been selected from the display images in the first hierarchy. Graphics (symbols) incapable of inclusion in lines of input characters can be provided. That is to say, certain symbols may be provided which are used only in the front ruling portion and the rear ruling portion in outer framing and tabulation. For example, all of the front ruling graphics and the rear ruling graphics in the apparatus-fixed patterns are classified from some viewpoint, and the classified symbols may be provided for use in the front and rear ruling portions. Conversely, the front ruling graphics and the rear ruling graphics in the apparatus-fixed patterns may be handled as symbols capable of inclusion in lines of input characters.

Figure 8:
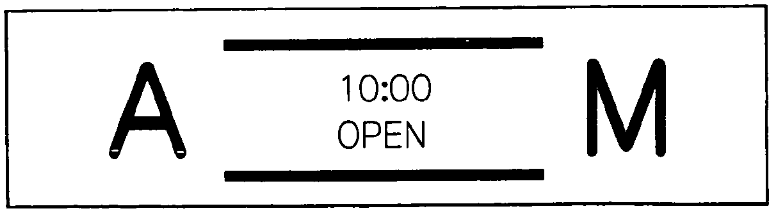
FIG. 8 is a view explanatory of examples of printed images, i.e., examples of produced labels, according to some patterns established by the user as illustrated in a modified embodiment of the invention.

In addition, in the first embodiment, symbols have been optionally designated by the user as the front ruling graphics and the rear ruling graphics. Things other than the symbols can also be designated. For example, ordinary characters such as "hiragana," "katakana," "kanji," and alphanumeric characters may be designated. Even these ordinary characters may be limited, by the use of a flag associated with characters and adapted for outer framing, to those which are possibly designated as front ruling graphics and rear ruling graphics. Moreover, it may be possible to designate, as front ruling graphics and rear ruling graphics, external characters which are often recorded as graphics, and illustrated data and the like which are read by an electronic camera or an image scanner (e.g., suitable for a tape printing apparatus assembled with a personal computer and its peripherals). FIG. 8 shows an example of outer framing patterns using ordinary characters. In FIG. 8, an "A" part and an "M" part are designated as a front ruling graphic and a rear ruling graphic, respectively.

Also in the first embodiment, the symbols (graphics) for the rear ruling portion have been automatically determined by the apparatus, depending upon the symbols (graphics) selected for the front ruling portion. In accordance with the symbols (graphics) selected for the front ruling portion, symbols (graphics) for the rear ruling portion, and line types for the upper ruling and lower ruling can be automatically determined by the apparatus. Similarly, according to the line types selected for the upper ruling, line types for the lower ruling may be automatically determined by the apparatus.

In the first embodiment, in accordance with the symbols (graphics) selected for the front ruling portion, the symbols (graphics) incapable of selection for the rear ruling portion have been preset by the apparatus. In accordance with the symbols (graphics) selected for the front ruling portion, symbols incapable of selection for the rear ruling portion, and line types for the upper ruling and lower ruling can be preset by the apparatus. Similarly, according to the line types selected for the upper ruling, line types for the lower ruling may be preset by the apparatus.

Further, in the first embodiment, the directions of symbols have been optionally designated irrespective of how the symbols for the front and rear ruling portions are combined together. Conditions can be made to provide possible combinations of symbols in which the directions of symbols are designated. For example, the directions of symbols may be designated, respectively, only when both the front ruling portion and the rear ruling portions are of the same symbol.

In addition, in the first embodiment, the directions of symbols have been designated with respect to the symbols determined for the front ruling portion and the rear ruling portion. Other modified attributes can be designated. For example, monoochromatic reversion may be designated with respect to symbols for the front and rear ruling portions.

In the first embodiment, the absence of elements has been designated in the front and rear ruling portions. Also with regard to the upper ruling and/or the lower ruling, the absence of elements can be designated. However, designation of the absence of all elements may be rejected.

In the first embodiment, the symbols designated as the outer framing elements have been dot-developed at the same magnification in the lengthwise and widthwise directions in the same manner as are designated as the elements for lines of input characters. In the modified embodiment, the magnification of dot development can be varied in the lengthwise and widthwise directions. For example, dot development may be effected at a modification ratio of 5:4 in both directions.

In the above embodiments, explanation has been directed mainly to the processing for imparting outer framing in horizontal writing. Similar reasoning is applicable to the processing for imparting outer framing in vertical writing. Note therefore that the words "front ruling," "rear ruling," "upper ruling," and "lower ruling" recited in the appended claims represent those used in vertical writing.

A specialized tape printing apparatus has been illustrated in the two embodiments of the present invention. The technical concepts of the invention can be used for a tape printing system in which a personal computer is connected to a label printer, a specialized stamp (signet) making apparatus, and a stamp making system in which a personal computer is connected to stamp making peripherals. For example, in such a tape printing system, certain programs are installed and utilized in the personal computer, the programs being derived from record media in which label producing programs (application programs) such as an outer framing-tabulation imparting program 22*a* and a print processing program 22*b* have been recorded. The technical concepts of the invention are also applicable to the outer framing functions in such a specialized stamp making apparatus and such a stamp making system, both of which are devoid of a tabulation function.

What is claimed is:

1. An apparatus for producing a small print, which has a framing imparting function including at least a front ruling element, a rear ruling element, an upper ruling element and a lower ruling element provided to enclose therein a few lines of input characters, the apparatus comprising:

arbitrarily frame element designating means for designating one optional character, for use as at least one of the front ruling element and the upper ruling element, from among characters capable of input as character elements in the lines of input characters; and arbitrarily frame element representing means for dot-developing, upon execution of a print command, the optional character element designated by the arbitrarily frame element designating means as at least one of the front ruling element and the upper ruling element.

2. The apparatus according to claim 1, wherein the arbitrarily frame element designating means designates whether the character element is to be reversed right and left, or above and below, when the character element is designated, for use as at least one of the front ruling element and the rear ruling element, from among characters capable of input as character elements in the lines of input characters.

3. A method for producing a small print, which has a framing imparting function including at least a front ruling element, a rear ruling element, an upper ruling element and a lower ruling element provided to enclose therein a few lines of input characters, the method comprising:

an arbitrarily frame element designating step for designating one optional character, for use as at least one of the front ruling element and the upper ruling element, from among characters capable of input as character elements in the lines of input characters; and an arbitrarily frame element representing step for dot-developing, upon execution of a print command, the optional character element designated in the arbitrarily frame element designating step as at least one of the front ruling element and the upper ruling element.

4. The method according to claim 3, wherein the arbitrarily frame element designating step designates whether the character element is to be reversed right and left, or above and below, when the character element is designated as at least one of the front ruling element and the rear ruling element from among characters capable of input as character elements in the lines of input characters.

5. A program for producing a small print, wherein a computer describes as executable codes steps for a method of the production of the small print, the method having a framing imparting function including at least a front ruling element, a rear ruling element, an upper ruling element and a lower ruling element provided to enclose therein a few lines of input characters, the method comprising:

an arbitrarily frame element designating step for designating one optional character for use as at least one of the front ruling element and the upper ruling element, from among characters capable of input as character elements in the lines of input characters; and an arbitrarily frame element representing step for dot-developing, upon execution of a print command, the optional character element designated in the arbitrarily frame element designating step as at least one of the front ruling element and the upper ruling element.

* * * * *

UNITED STATES PATENT AND TRADEMARK OFFICE

CERTIFICATE OF CORRECTION

PATENT NO. : 7,033,092 B2
APPLICATION NO. : 10/942101
DATED : April 25, 2006
INVENTOR(S) : Horii et al.

It is certified that error appears in the above-identified patent and that said Letters Patent is hereby corrected as shown below:

On the Title of the Patent item 73 the identification of the "Assignee" as "Charterec Semiconductor Manufacturing Ltd., Singapore (SG)"

Should read:

-- King Jim Co., Ltd., Tokyo (JP) and Seiko Epson Corporation, Tokyo (JP) --

Signed and Sealed this

Twenty-first Day of November, 2006

JON W. DUDAS

*Director of the United States Patent and Trademark Office*